US007153901B2

(12) United States Patent
Hussain et al.

(10) Patent No.: US 7,153,901 B2
(45) Date of Patent: Dec. 26, 2006

(54) FLAME RETARDANT, ADDITIVE COMPOSITIONS, AND FLAME RETARDANT POLYURETHANES

(75) Inventors: Saadat Hussain, Baton Rouge, LA (US); Jeffrey Todd Aplin, Baton Rouge, LA (US); William R. Brown, Baton Rouge, LA (US); Charles H. Kolich, Baton Rouge, LA (US); Arthur G. Mack, Prairieville, LA (US)

(73) Assignee: Albemarle Corporation, Richmond, VA (US)

( * ) Notice: Subject to any disclaimer, the term of this patent is extended or adjusted under 35 U.S.C. 154(b) by 433 days.

(21) Appl. No.: 10/719,948

(22) Filed: Nov. 21, 2003

(65) Prior Publication Data

US 2005/0113495 A1    May 26, 2005

(51) Int. Cl.
    *C08K 5/12*    (2006.01)
(52) U.S. Cl. .................... 524/464; 524/469; 252/609
(58) Field of Classification Search ................ 524/464, 524/469; 252/609
    See application file for complete search history.

(56) References Cited

U.S. PATENT DOCUMENTS

| 4,289,856 A * | 9/1981 | Yamamoto et al. ........... 521/51 |
| 5,777,151 A | 7/1998 | Crochemore |
| 6,348,514 B1 * | 2/2002 | Calabrese et al. .......... 521/130 |
| 6,521,703 B1 | 2/2003 | Zarnoch et al. |
| 2003/0096123 A1 | 5/2003 | Yeager |
| 2003/0144371 A1 | 7/2003 | Kornetani et al. |
| 2003/0153656 A1 * | 8/2003 | Sjerps ........................ 524/115 |

FOREIGN PATENT DOCUMENTS

| JP | 61050944 | 3/1986 |
| JP | 61227550 | 10/1986 |
| JP | 62298560 | 12/1987 |
| JP | 63251408 | 10/1988 |
| WO | WO 00/35999 | 6/2000 |
| WO | WO 01/51538 A1 | 7/2001 |
| WO | WO 02/062863 A2 | 8/2002 |
| WO | WO 03/060000 A1 | 7/2003 |
| WO | WO 03/091308 A1 | 11/2003 |
| WO | WO 2004/078817 A1 | 9/2004 |

* cited by examiner

*Primary Examiner*—Peter Szekely
(74) *Attorney, Agent, or Firm*—Jeremy J. Kliebert

(57) ABSTRACT

Provided are new flame retardants and liquid flame retardant additive compositions of low viscosity for use in flexible polyurethane foams. The new flame retardants are the reaction product of at least one brominated aromatic diester diol with at least one alcohol-reactive agent. Preferred liquid flame retardant additive compositions are capable of minimizing visible scorching of the foam during its production. Flexible flame retardant polyurethane foams and methods for their production are also provided. The flame retardant additive compositions are formed at least from a) at least one reaction product of a brominated aromatic diester diol and an alcohol-reactive agent; b) at least one hindered amine antioxidant; and c) at least one phenolic antioxidant in which the phenolic ring is substituted by an alkanoic acid alkyl ester group in which alkanoic acid moiety has in the range of 2 to about 4 carbon atoms and the alkyl group has in the range of about 6 to about 16 carbon atoms.

40 Claims, No Drawings

FLAME RETARDANT, ADDITIVE COMPOSITIONS, AND FLAME RETARDANT POLYURETHANES

TECHNICAL FIELD

This invention relates to new flame retardants, novel flame retardant additive compositions for use in the production of flexible polyurethane foams, and to flame retardant flexible polyurethane foams made using such additive compositions or the components thereof in the production of such foams.

BACKGROUND

The manufacture of flexible polyurethane foams requires mixing components (e.g., isocyanates and polyols along with various surfactants, water, auxiliary blowing agents, catalysts, etc., depending on the foam to be produced, its density and cell structure) and causing or allowing them to react. Modern equipment or techniques involve metering components into a reaction chamber wherein they are mixed and passed onto a conveyor or in a mold where the mixture is allowed to foam. Flame retardants are metered into the reaction chamber along with the other components for mixing.

Because polyurethane foams are produced by reaction involving two main liquid components, viz., isocyanates and polyols, it is desirable for a flame retardant composition to be in the form of a liquid with low viscosity so that it will mix readily and thoroughly with the reactants at ordinary ambient temperatures.

In the manufacture of flexible foams large billets or buns of foam are produced and then set aside to cure or to complete the polymerization reaction. Temperatures within the billet from the reaction can reach 150° to 180° C. and higher. The insulating properties of the foam maintain this temperature in the interior of the billet for an extended period of time. Thus, components which are introduced into the foam, including the flame retardant components, should, if possible, be able to withstand high temperatures and not cause scorching or charring to be visible in the foam. As antioxidants are typically more expensive than the flame-retardant component, it would be highly desirable to reduce the loading of the antioxidant component to 1 wt % or less of the foam.

THE INVENTION

In accordance with one embodiment of this invention, new flame retardants are provided, and new effective flame retardant additive compositions for use in flexible polyurethane foams are provided. In accordance with a preferred embodiment of this invention, new flame retardant additive compositions for flexible polyurethane foams are provided that minimize the amount of antioxidant component required, and that are capable of minimizing visible scorching of the foam during its production. Foams exhibit little visible evidence of scorching while in the form of a billet or bun during and after the time the billet or bun is cooling down to ambient room temperature. For example, SAYTEX® RB-79 flame retardant (a mixed ester of tetrabromophthalic anhydride with diethylene glycol and propylene glycol; Albemarle Corporation) which has been reacted with acetic anhydride gives foams with lower scorch values, while using only 1 wt % antioxidant in the foam.

Other embodiments of this invention include the provision of flexible flame retardant polyurethane foams, and preferably flexible flame retardant foams that exhibit little visible evidence of scorching while in the form of a billet or bun. Processes of producing the respective flexible polyurethane foams referred to in this paragraph constitute still further embodiments of this invention.

The new flame retardants of this invention comprise the reaction product of at least one brominated aromatic diester diol with at least one alcohol-reactive agent. The alcohol reactive agent is (i) an anhydride containing from four to about eight carbon atoms, (ii) an acyl halide containing from two to about eight carbon atoms, (iii) at least one dihydrocarbyl phosphate, (iv) at least one dihalohydrocarbyl phosphate, wherein each halogen atom is chlorine or bromine, (v) at least one dihydrocarbyl chlorophosphate, (vi) at least one dihalohydrocarbyl chlorophosphate, wherein each halogen atom is chlorine or bromine, (vii) at least one dihydrocarbyl chlorothiophosphate, (viii) at least one dihalohydrocarbyl chlorothiophosphate, wherein each halogen atom is chlorine or bromine, or (ix) mixtures of two or more of the foregoing alcohol-reactive agents.

The new flame retardant additive compositions of this invention comprise a liquid mixture formed from at least the following components or ingredients:

a) at least one reaction product of a brominated aromatic diester diol and an alcohol-reactive agent;

b) at least one hindered amine antioxidant; and c) at least one phenolic antioxidant in which the phenolic ring is substituted by an alkanoic acid alkyl ester group in which alkanoic acid moiety has in the range of 2 to about 4 carbon atoms and the alkyl group has in the range of about 6 to about 16 carbon atoms.

Typically in forming the mixture these components or ingredients are used in amounts such that on a weight basis (1) the proportions of b) to c) are in the range of about 3:1 to about 1:3; and (2) the weight ratio of a) to b) plus c) is in the range of about 5:1 to about 25:1, and preferably in the range of about 7:1 to about 15:1.

Flexible polyurethane foams of this invention will typically be formed using about 2.5–10.5 parts by weight of a), about 0.05–0.4 part by weight of b), and about 0.05–0.4 part by weight of c) per each 100 parts by weight of polyol used in forming the polyurethane foam. Preferred flexible polyurethane foams of this invention are formed using about 4.0–8.4 parts by weight of a), about 0.09–0.2 part by weight of b), and about 0.09–0.2 part by weight of c) per each 100 parts by weight of polyol used in forming the polyurethane foam. Preferably, these components are used in the form of a preformed liquid flame retardant additive composition of this invention as this simplifies the blending step and minimizes the possibility of blending errors. However, if desired, components or ingredients a), b), and c) can be added individually and/or in one or more subcombinations to the mixture to be used in forming the polyurethane.

Departures from the above amounts and proportions whenever deemed necessary or desirable are permissible and within the scope of this invention.

The above and other embodiments and features of this invention will be still further apparent from the ensuing description.

New Flame Retardant

The result of the reaction between the brominated aromatic diester diol and the alcohol-reactive agent is the new flame retardant.

Various liquid brominated aromatic diester diols can be used. Typically these compounds are liquid diol esters of a bromoaromatic 1,2-dicarboxylic acid or anhydride in which the compound has 1–4, and preferably 2–4, bromine atoms per molecule. Non-limiting examples of such liquid bromoaromatic diol esters include the reaction product of 1,4-butane diol and propylene oxide with tetrabromophthalic anhydride, the reaction product of diethylene glycol and ethylene oxide with tetrabromophthalic anhydride, the reaction product of tripropylene glycol and ethylene oxide with tribromophthalic anhydride, the reaction product of 1,3-butane diol and propylene oxide with tetrabromophthalic anhydride, the reaction product of dipropylene glycol and ethylene oxide with dibromosuccinic anhydride, the reaction product of two moles of ethylene oxide with tribromophthalic anhydride and other similar compounds.

The more preferred compounds of this type are liquid diol esters of polybromophthalic acid or anhydride, especially where the aromatic moiety has 4 bromine atoms. Examples of such more preferred compounds are SAYTEX® RB-79 flame retardant (Albemarle Corporation), and PHT4-Diol (Great Lakes Chemical Corporation). Methods for manufacturing such compounds and other examples of such compounds are described for example in U.S. Pat. No. 4,564,697 issued Jan. 14, 1986 to Burton J. Sutker and entitled "Halogenated Polyol-Ester Neutralization Agent".

As stated before, the alcohol-reactive agent can be an anhydride containing from four to about eight carbon atoms, an acyl halide containing from two to about eight carbon atoms, at least one dihydrocarbyl phosphate, at least one dihalohydrocarbyl phosphate, wherein each halogen atom is chlorine or bromine, at least one dihydrocarbyl chlorophosphate, at least one dihalohydrocarbyl chlorophosphate, wherein each halogen atom is chlorine or bromine, at least one dihydrocarbyl chlorothiophosphate, at least one dihalohydrocarbyl chlorothiophosphate, wherein each halogen atom is chlorine or bromine, or mixtures of two or more of the foregoing alcohol-reactive agents. The alcohol-reactive agent is normally and preferably a single agent of one type. It is usually preferable to use only one alcohol-reactive agent for better control of the reaction and the flame retardant product.

An anhydride containing from four to about eight carbon atoms can be used as an alcohol-reactive agent in the practice of this invention. Examples of suitable anhydrides include acetic anhydride, chloroacetic anhydride, bromoacetic anhydride, iodoacetic anhydride, dichloroacetic anhydride, propionic anhydride, n-butyric anhydride, isobutyric anhydride, isovaleric anhydride (3-methylbutyric anhydride), maleic anhydride, dichloromaleic anhydride, succinic anhydride, and the like. Anhydrides are a preferred type of alcohol-reactive agent. Acetic anhydride is a particularly preferred anhdride.

Another type of alcohol-reactive agent that can be used is an acyl halide containing from two to about eight carbon atoms. Suitable acyl halides include acetyl chloride, acetyl bromide, chloroacetyl chloride, bromoacetyl bromide, propanoyl chloride, 3-bromopropanoyl chloride, 3-butenoyl chloride, 3-methyl-2-butenoyl chloride, and the like.

For the dihydrocarbyl phosphates, the hydrocarbyl groups are the same or different and can be, for example, saturated, branched, straight-chain, cycloalkyl, cycloalkylalkyl, unsaturated, aryl, or aralkyl. Suitable dihydrocarbyl phosphates include dimethyl phosphate, methylethyl phosphate, diethyl phosphate, divinyl phosphate, diisopropyl phosphate, dicyclopropyl phosphate, diallyl phosphate, di-tert-butyl phosphate, dicyclobutyl phosphate, bis(2-butenyl)phosphate, dipentyl phosphate, dicyclopentyl phosphate, bis(4-pentenyl) phosphate, ethylpentyl phosphate, dicyclohexenyl phosphate, di(methylcyclohexyl) phosphate, dioctenyl phosphate, diphenyl phosphate, dibenzyl phosphate, di-p-tolyl phosphate, di-m-tolyl phosphate, di-o-tolyl phosphate, bis (2,5-dimethylphenyl)phosphate, bis(2-isopropylphenyl) phosphate, dinaphthyl phosphate, and the like.

In the dihalohydrocarbyl phosphates, each halogen atom is chlorine or bromine, and the halohydrocarbyl groups may be the same or different, and can be, for example, saturated, branched, straight-chain, cycloalkyl, cycloalkylalkyl, unsaturated, aryl, or aralkyl. Dihalohydrocarbyl phosphates that can be used as the alcohol-reactive agent include, but are not limited to, di(chloromethyl)phosphate, bis(dibromomethyl) phosphate, bis(trichloromethyl)phosphate, bis(tribromomethyl)phosphate, bis(2-bromoethyl)phosphate, bis(1,2-dibromoethyl)phosphate, bis(2,2,2-trichloroethyl)phosphate, bis(2-bromovinyl)phosphate, bis(3-bromopropyl)phosphate, bis(2,3-dichloropropyl)phosphate, bis(1-bromomethyl-2-chloroethyl)phosphate, bis(2,3-dichloroallyl)phosphate, bis(4,4,4-tribromobutyl)phosphate, bis(2,3,4-trichlorobutyl)phosphate, bis(2-chloropentyl)phosphate, bis (3-bromocyclopentyl)phosphate, bis(2,2-dichlorocyclohexyl)phosphate, bis(2-chlorophenyl) phosphate, bis(4-bromophenyl bis(2,5-dichlorophenyl) phosphate, bis(2,4-dibromophenyl)phosphate, bis (trichloromethylphenyl)phosphate, bis(3,5-dibromomethylphenyl)phosphate, bis(2,6-chloromethylphenyl)phosphate, bis(2-chloro-1-naphthyl) phosphate, and bis(1,4-dibromo-2-naphthyl)phosphate.

The hydrocarbyl groups of the dihydrocarbyl chlorophosphate are the same or different, and can be, for example, saturated, branched, straight-chain, cycloalkyl, cycloalkylalkyl, unsaturated, aryl, or aralkyl. Suitable dihydrocarbyl chlorophosphates include dimethyl chlorophosphate, diethyl chlorophosphate, divinyl chlorophosphate, dicyclopropyl chlorophosphate, n-butylethyl chlorophosphate, di-n-propyl chlorophosphate, diallyl chlorophosphate, di-n-butyl chlorophosphate, bis(3-butenyl)chlorophosphate, dicyclopentyl chlorophosphate, bis(5-pentenyl)chlorophosphate, dimethylcyclohexyl chlorophosphate, dihexyl chlorophosphate, diheptyl chlorophosphate, dicycloheptenyl chlorophosphate, dioctenyl chlorophosphate, dinonyl chlorophosphate, ethylphenyl chlorophosphate, diphenyl chlorophosphate, di-o-tolyl chlorophosphate, di-p-tolyl chlorophosphate, phenyl (p-tolyl)chlorophosphate, bis(3,5-dimethylphenyl) chlorophosphate, bis(4-isopropylphenyl)chlorophosphate, and the like. Dihydrocarbyl chlorophosphates are a preferred type of alcohol-reactive agent. Preferred dihydrocarbyl chlorophosphates are diaryl chlorophosphates. A particularly preferred diaryl chlorophosphate is diphenyl chlorophosphate.

Dihalohydrocarbyl chlorophosphates have halohydrocarbyl groups that are the same or different, and can be, for example, saturated, branched, straight-chain, cycloalkyl, cycloalkylalkyl, unsaturated, aryl, or aralkyl, in which halohydrocarbyl groups each halogen atom is chlorine or bromine. Examples of dihalohydrocarbyl chlorophosphates that can be used as the alcohol-reactive agent include, but are not limited to, di(bromomethyl)chlorophosphate, bis(dichloromethyl)chlorophosphate, di(tribromomethyl)chlorophosphate, di(trichloromethyl)chlorophosphate, bis(2-chloroethyl)chlorophosphate, bis(1,2-dibromoethyl) chlorophosphate, bis(2,2,2-trichloroethyl)chlorophosphate, bis(2,2-dichlorovinyl)chlorophosphate, bis(3-bromopropyl) chlorophosphate, bis(3,3-dibromopropyl)chlorophosphate, bis(2,3-dichloropropyl)chlorophosphate, bis(2,3-dibromoallyl)chlorophosphate, bis(4,4,4-trichlorobutyl)chlorophosphate, bis(2,3,4-tribromobutyl)chlorophosphate, bis(2-bromopentyl)chlorophosphate, bis(3-chlorocyclopentyl)chlorophosphate, bis(2,2-dibromocyclohexyl)chlorophosphate, bis(tribromomethylphenyl)chlorophosphate, bis(dichloromethylphenyl)chlorophosphate, bis[2,5-di(tribromomethyl)phenyl]chlorophosphate, bis(3,5-dibromomethylphenyl)chlorophosphate, bis(2,6-chloromethylphenyl)chlorophosphate, bis(4-chlorophenyl)chlorophosphate, bis(2-bromophenyl)chlorophosphate, bis(2,4-dichlorophenyl)chlorophosphate, bis(2,5-dibromophenyl)chlorophosphate, bis(8-chloro-1-naphthyl)chlorophosphate, bis(4,5-dibromo-2-naphthyl)chlorophosphate, and 2-chlorophenyl 2,2,2-trichloroethyl chlorophosphate.

Still another type of alcohol-reactive agent are dihydrocarbyl chlorothiophosphates. The hydrocarbyl groups of the dihydrocarbyl chlorothiophosphate(s) may be the same or different, and can be, for example, saturated, branched, straight-chain, cycloalkyl, cycloalkylalkyl, unsaturated, aryl, or aralkyl. Suitable dihydrocarbyl chlorothiophosphates include, but are not limited to, dimethyl chlorothiophosphate, diethyl chlorothiophosphate, divinyl chlorothiophosphate, diisopropyl chlorothiophosphate, diallyl chlorothiophosphate, di-tert-butyl chlorothiophosphate, dicyclobutenyl chlorothiophosphate, bis(2-butenyl)chlorothiophosphate, dipentyl chlorothiophosphate, dicyclopentyl chlorothiophosphate, dihexyl chlorothiophosphate, dimethylcyclohexyl chlorothiophosphate, diheptyl chlorothiophosphate, diheptenyl chlorothiophosphate, dinaphthyl chlorothiophosphate, diphenyl chlorothiophosphate, di-o-tolyl chlorothiophosphate, di-m-tolyl chlorothiophosphate, di-p-tolyl chlorothiophosphate, bis(2,6-dimethylphenyl)chlorothiophosphate, and bis(3,5-diethylphenyl)chlorothiophosphate.

The dihalohydrocarbyl chlorothiophosphates have halohydrocarbyl groups that are the same or different, and can be, for example, saturated, branched, straight-chain, cycloalkyl, cycloalkylalkyl, unsaturated, aryl, or aralkyl, and each halogen atom is chlorine or bromine. Examples of dihalohydrocarbyl chlorothiophosphates that can be used as alcohol-reactive agents include di(bromomethyl)chlorothiophosphate, bis(dichloromethyl)chlorothiophosphate, bis(tribromomethyl)chlorothiophosphate, bis(trichloromethyl)chlorothiophosphate, bis(2-chloroethyl)chlorothiophosphate, bis(1,2-dibromoethyl)chlorothiophosphate, bis(2,2,2-trichloroethyl)chlorothiophosphate, bis(2-bromovinyl)chlorothiophosphate, bis(2-bromopropyl)chlorothiophosphate, bis(2,3-dichloropropyl)chlorothiophosphate, bis(3,3-dichloropropyl)chlorothiophosphate, bis(3,3-dichloroallyl)chlorothiophosphate, bis(4,4,4-tribromobutyl)chlorothiophosphate, bis(2,3,4-trichlorobutyl)chlorothiophosphate, bis(2-chloropentyl)chlorothiophosphate, bis(3-bromocyclopentyl)chlorothiophosphate, bis(2,2-dichlorocyclohexyl)chlorothiophosphate, bis(4-chlorophenyl)chlorothiophosphate, bis(2-bromophenyl)chlorothiophosphate, bis(2,5-dibromophenyl)chlorothiophosphate, bis(2,6-dichlorophenyl)chlorothiophosphate, bis(tribromomethylphenyl)chlorothiophosphate, bis(dichloromethylphenyl)chlorothiophosphate, bis(2,6-bromomethylphenyl)chlorothio-phosphate, bis[2,5-di(tribromomethyl)phenyl]chlorothiophosphate, bis(2-chloro-1-naphthyl)chlorothiophosphate, bis(1,8-dibromo-2-naphthyl)chlorothiophosphate, and the like.

The brominated aromatic diester diol and the alcohol-reactive agent may be brought together in any order, although it is preferred to add the alcohol-reactive agent to the brominated aromatic diester diol. Reaction temperatures are preferably in the range of about 70 to about 150° C. on the laboratory scale. Reaction times on the laboratory scale are typically in the range of one to about four hours. The reaction temperature and/or the reaction time may vary with the choice of alcohol-reactive agent and brominated aromatic diester diol. It is desirable, but not necessary, that the reaction product, the new flame retardant, be in liquid form.

The reaction product mixture formed by contacting the brominated aromatic diester diol and the alcohol-reactive agent, containing the flame retardant, usually also contains one or more acid side products. A preferred method for treating the reaction product mixture to remove the acid side products is the use of an epoxide to convert the acids to alcohols. No further manipulation of the reaction product mixture is necessary before the contact with the epoxide. Another method for removal of acid side products is vacuum distillation of the reaction product mixture, which usually removes a large amount of the acid side products. A highly preferred method for removal of the acid side products is vacuum distillation followed by treatment of the reaction product mixture with an epoxide to convert any remaining acid side products into alcohols. Although the order of addition does not matter, it is generally preferred to add the epoxide to the reaction product mixture.

Epoxides that can be used in the treatment of acid side products in the reaction product mixture include, but are not limited to, ethylene oxide, propylene oxide, trimethylene oxide, isobutylene oxide, 1,2-epoxy-2-methylbutane, 2,3-epoxy-2-methylbutane, 1,2-epoxyhexane, cyclohexene oxide, 1,2-epoxyoctane, cyclooctene oxide, 1,2-epoxydecane, 1,2-epoxydodecane, and cyclododecane epoxide. Preferred epoxides are those in which the hydrocarbyl portion is a branched or straight chain; more preferred epoxides are ethylene oxide, propylene oxide, and isobutylene oxide. The most preferred epoxides are ethylene oxide and propylene oxide.

Flame Retardant Additive Compositions

As used herein, the term "liquid" means that the additive composition is in the liquid state of aggregation at 22° C. even if no ancillary solvent is present. Thus at least some, and preferably all of the components or ingredients of a), b), and c) are themselves in the liquid state of aggregation at 22° C. However, it is permissible for one or more such components or ingredients to be in the solid state of aggregation at 22° C., provided at least one such component or ingredient is in the liquid state of aggregation at 22° C. and the presence of such liquid component(s) or ingredient(s) in the composition results in the overall composition of components or ingredients of a), b), and c) being in the liquid state of aggregation at 22° C. Preferred liquid additive compositions of this invention have a viscosity of no more than about 1000 to 15,000 centipoise (using a Brookfield viscometer) at 25° C.

If instead of using a liquid additive composition of this invention, one or more of components or ingredients a), b), and c) are added to the polymerization formulation or recipe individually and/or as one or more subcombinations, it is preferred that each such individual component or ingredient and/or each subcombinations thereof be a liquid. However, one or more such components or ingredients can be in the solid state provided they can be rapidly and homogeneously mixed into the polymerization formulation or recipe. As is known in the art, a polymerization formulation or recipe apart from components or ingredients a), b), and c) typically comprises at least one or more of such components or ingredients as the following: polyol, isocyanate, surfactant, catalyst, and blowing agent.

Component a)

This component is formed from a brominated aromatic diester diol, which, as previously stated, is a reaction product of a brominated aromatic diester diol and an alcohol-reactive agent, where the brominated aromatic diester diols and alcohol-reactive agents are as described above.

Component b)

This component is at least one hindered amine antioxidant which preferably is a liquid. One type of liquid hindered amine antioxidant is a liquid alkylated diphenylamine in which the alkyl ring substituent or substituents each contain about 4–9 carbon atoms. One such product is Irganox® 5057 antioxidant (Ciba Specialty Chemicals, Inc.) which is a mixture N-phenylbenzeneamine (i.e., diphenylamine) reaction products with 2,4,4-trimethylpentene. A similar product is available from Great Lakes Chemical Corporation under the trade designation Durad® AX 57. Non-limiting examples of other suitable liquid hindered amine antioxidant components include Durad AX 55 (mixture of tertiary octylated and styrenated diphenylamine), Durad AX 59 (nonylated diphenylamine), and Irgastab® PUR 55 (Ciba Specialty Chemicals, Inc.) which is a mixture of diphenylamines with side chains on the phenyl ring having about 6–9 carbon atoms and hindered phenols with ester side chains having about 8–10 carbon atoms. Also suitable are hindered-amine antioxidants such as 4-benzoyloxy-2,2,6,6-tetramethylpiperidine, bis(2,2,6,6-tetramethyl-4-piperidinyl)sebacate, bis(1-octyloxy-2,2,6,6-tetramethyl-4-piperidinyl)sebacate, bis(1,2,2,6,6-pentamethyl-4-piperidinyl)sebacate, dimethyl succinate-1-(2-hydroxyethyl)4-hydroxy-2,2,6,6-tetramethylpiperidine and condensed products thereof, and 8-acetyl-3-dodecyl-7,7,9,9-tetramethyl-1,3,8-triazaspyrro[4,5]decane-2,4-dione. These may be used individually or in combinations with each other, or with other hindered amine antioxidants. Use of Irgastab® PUR 55 is preferred.

Component c)

One or more liquid phenolic antioxidants in which the phenolic ring is substituted by an alkanoic acid alkyl ester group are used as this component. The phenolic ring is preferably sterically hindered by having one or preferably each of its ortho positions substituted by an alkyl or cycloalkyl group such that the total number of carbon atoms in the ortho alkyl or cycloalkyl group(s) is at least 4 and more preferably at least 5. Desirably at least one such ortho substituent is a tertiary alkyl group, most preferably a tertiary butyl group. The alkanoic acid alkyl ester substituent group is preferably in the para position relative to the hydroxyl group, and is composed of an $C_{2-6}$ alkanoic acid group (preferably a propionic acid group) which is esterified with an alkyl group having in the range of about 6–16 carbon atoms. In other words, this substituent group can be depicted as —$R^1COOR^2$, where $R^1$ is alkylene having 1–5 carbon atoms and $R^2$ is alkyl having in the range of about 6 to about 16 carbon atoms, and preferably in the range of about 6 to about 10 carbon atoms. Mixtures of two or more such alkyl ester substituted phenolic antioxidants can be used. One example of a useful compound of this type is Irganox® 1135 antioxidant (Ciba Specialty Chemicals, Inc.) which chemically is indicated by the manufacturer to be an isooctyl ester of 3,5-di-tert-butyl-4-hydroxylphenylpropionic acid (or a $C_7$–$C_9$ branched alkyl ester of 3,5-bis(1,1-dimethylethyl)-4-hydroxybenzenepropionic acid). Other non-limiting examples of compounds of this type that may be used include $C_7$–$C_9$ branched alkyl ester of 3-tert-butyl-5-methyl-4-hydroxylphenylpropionic acid, $C_7$–$C_9$ branched alkyl ester of 3,5-diisopropyl-4-hydroxylphenylpropionic acid, $C_6$–$C_8$ branched alkyl ester of 3-tert-amyl-5-methyl-4-hydroxylphenylpropionic acid, $C_8$–$C_{10}$ branched alkyl ester of 3,5-di-tert-butyl-4-hydroxylphenylacetic acid, $C_7$–$C_8$ branched alkyl ester of 3-tert-butyl-5-methyl-4-hydroxylphenylbutyric acid, and $C_6$ branched alkyl ester of 3-tert-amyl-5-methyl-4-hydroxylphenylhexanoic acid.

Other Components of the Polymerization Formulation or Recipe

Apart from components or ingredients a), b), and c), other components used in forming polyurethane polymerization formulations or recipes are well known to those of ordinary skill in the art. Flexible polyurethane foams are typically prepared by chemical reaction between two liquids, isocyanates and polyols. The polyols are polyether or polyester polyols. The reaction readily occurs at room temperature in the presence of a blowing agent such as water, a volatile hydrocarbon, halocarbon, or halohydrocarbon, or mixtures of two or more such materials. Catalysts used in effecting the reaction include amine catalysts, tin-based catalysts, bismuth-based catalysts or other organometallic catalysts, and the like. Surfactants such as substituted silicone compounds are often used in order to maintain homogeneity of the cells in the polymerization system. Hindered phenolic antioxidants, e.g., 2,6-di-tert-butyl-para-cresol and methylenebis(2,6-di-tert-butylphenol), can be used to further assist in stabilization against oxidative degradation. These and other ingredients that can be used, and the proportions and manner in which they are used are reported in the literature. See for example: Herrington and Hock, *Flexible Polyurethane Foams*, The Dow Chemical Company, 1991, 9.25–9.27 or Roegler, M "Slabstock Foams"; in *Polyurethane Handbook*; Oertel, G., Ed.; Hanser Munich, 1985, 176–177 or Woods, G. *Flexible Polyurethane Foams, Chemistry and Technology*; Applied Science Publishers, London, 1982, 257–260.

In the practice of this invention preferred polyols include Voranol® 3010 polyol, (The Dow Chemical Company, Midland, Mich.) and Pluracol® 1718 polyol (BASF Corporation, Mt. Olive, N.J.).

Preferred isocyanates include Mondur TD-80, Mondur PF (Bayer Corporation, Pittsburgh, Pa.) and Luprinate T80 (BASF Corporation).

Preferred surfactants include Niax® L-620 (OSi Specialties, Greenwich, Conn.) or any other of the many polyether-polysilicone copolymers used in typical flexible polyurethane slabstock foams.

Preferred blowing agents include a combination of water and methylene chloride, Freon 11, or acetone, in a weight ratio in the range of about 1:2 to 2:1, respectively; with water and methylene chloride being the preferred combination.

Preferred catalyst systems include a combination of a blend of amine catalysts such as a blend of (i) dimethylethyl amine, triethylene diamine, and bis(dimethylaminoethyl) ether) and (ii) DABCO® T-16 amine, in a weight ratio in the range of about 0.2–0.3:1, respectively; depending upon air flow and processing needs.

The following Examples are presented for purposes of illustration, and are not intended to limit the generic scope of the invention.

EXAMPLE 1

Reaction of Brominated Diester Diol with Acetic Anhydride

SAYTEX® RB-79 diol flame retardant (1900 g; a mixed ester of tetrabromophthalic anhydride with diethylene glycol and propylene glycol; Albemarle Corporation) was charged to a 2 L reactor and heated to 120° C. Acetic anhydride (701 g, 6.87 mol) was then added with stirring over a 1 hour period. The mixture was cooked for 3 hours at 120–140° C. The mixture was vacuum stripped at 35 mm Hg and 130° C. with a slight $N_2$ purge for about 1 hour. A sample was taken for an acid number determination and the value was estimated to be about 3.1. Propylene oxide (25 g, 0.43 mol) was added to the mixture, which was then stirred for 30 minutes, after which time the acid number was found to be about 0.6. A further 27 g (0.46 mol) of propylene oxide were added, and the mixture was stirred for 1 hour at 130° C. The mixture was drained into glass bottles for analysis. The viscosity of the mixture was determined to be 1900 cP at 25° C. using glass capillary viscometers; the acid number was determined to be 0.64; and the amount of bromine in the mixture was 40.1 wt % (X-ray fluorescence).

EXAMPLE 2

Reaction of Brominated Diester Diol with Acetic Anhydride

A 1-L, 3-necked glass reactor equipped with a mechanical stirrer, a thermometer with a temperature regulator, a glycol-cooled (0° C.) reflux condenser, an addition funnel and a nitrogen flush assembly, was charged with SAYTEX® RB-79 diol flame retardant (556 g, 0.885 mol; heated to 75° C. prior to addition to allow good flow) and stirred at 75° C. under nitrogen. The addition funnel was charged with acetic anhydride (180.5 g, 1.77 mol), which was then added drop-wise to the diol during 20 minutes. A small (8° C.) exotherm was noticed during the addition which allowed the reaction temperature to rise to 83° C. The reaction mixture lightened in color at this point. The contents were heated to 95° C. and stirred at that temperature under nitrogen for the next four hours. The equipment was now set for distillation by installing a Barrett trap and the reaction temperature was raised to 130° C. to distill acetic acid by-product. The reaction mixture was then poured into a round-bottom flask and concentrated at the rotary evaporator at 95° C. (4–5 torr) for 45 minutes to give 629 g (0.883 mole, 99.8%) of the product as a pale yellow liquid. The acid number of this product was determined to be 4.5.

The product was re-heated and transferred back to the reactor and then 300 mL of toluene and 200 mL of water were added. The material dissolved in toluene and formed the bottom, organic layer. The phases were heated and stirred at 45° C. for 15 minutes, then the phases were allowed to separate. The pH of aqueous layer was measured to be equal to 4. While stirring at 45° C., aqueous caustic (50%) was added until the pH of the aqueous layer was about 8. The phases were allowed to separate and then the lower, organic phase was removed and concentrated under reduced pressure (rotary evaporator, 3–4 torr) at 90° C. for one hour to give 579.6 g (0.814 mole, 92.5%) of the product as a pale yellow liquid. The acid number was determined to be 0.14 and FT-IR spectra were recorded which confirmed the ester formation and total absence of the hydroxyl groups of the starting material. The TGA indicated the following weight loss profile: 5% loss at 162.6° C., 10% loss at 194.4° C., 50% loss at 339.7° C.

EXAMPLE 3

Reaction of Brominated Diester Diol with Diphenylchlorophosphate

All operations were performed under a slow stream of nitrogen.

A 1-L three-necked flask was equipped with a mechanical stirrer, a thermometer with a temperature regulator, an addition funnel, a glycol-cooled (0° C.) reflux condenser, a heating mantle, a nitrogen flush assembly and a caustic scrubber. The flask was charged with SAYTEX® RB-79 diol flame retardant (pre-heated to 80° C. to facilitate easy transfer) which was then allowed to cool to room temperature. Chloroform (250 mL) was then added and the solution was stirred at ambient temperature. The addition funnel was charged with diphenylchlorophosphate (143.4 g, 0.533 mol). The reaction mixture was heated to reflux (61° C.) and diphenylchlorophosphate was added drop-wise to the refluxing RB-79/chloroform solution over a period of fifteen minutes. The resulting mixture was refluxed at 65–67° C. for about 2.5 hours and then cooled to 35° C. Anhydrous magnesium chloride (1 g) was added, and the reaction mixture was heated again at reflux (67° C.) for three hours. A sample was taken for P-31 NMR, which showed a small amount of unreacted diphenylchlorophosphate still present. The reaction mixture was then cooled to 35° C. and another 1.4 grams of anhydrous $MgCl_2$ were added, followed by heating at reflux again for another 2.5 hours. A sample was taken for P-31 NMR, which showed the reaction to be virtually complete.

Water (300 mL) was added to the reaction mix and the mixture was stirred well. A white suspension formed which was allowed to separate into phases. The pH of the upper, aqueous layer was measured to be zero. With stirring, aqueous caustic (50%) was added dropwise until the pH of the aqueous layer was about 10. The phases were allowed to separate and the bottom, organic layer was concentrated under reduced pressure at 90° C. for 45 minutes to give 289.3 grams (99.2% yield) of a light amber liquid. This product had an acid number of 0.68 and a P-31 NMR spectrum (in $CDCl_3$) showed a single absorption at −10.6 ppm, indicating formation of the desired material with excellent purity.

EXAMPLE 4

Formation and Testing of Additive Compositions

A flexible polyurethane foam formulation was prepared from Pluracol® 1718 polyol, (a 3000 molecular weight polyoxypropylene triol, BASF Corporation); toluene diisocyanate (TDI; Mondur® TD-80, Bayer Corporation, Pittsburgh, Pa.); Niax® L-620 surfactant (a silicone surfactant; OSi Specialties); a blend of amine catalysts (dimethylethyl amine, triethylene diamine, and bis(dimethylaminoethyl) ether); T-16 tin-based catalyst (60% dibutyltin dilaurate and 40% dipropylene glycol available from Air Products and Chemicals); water as blowing agent; and methyl chloride as auxiliary blowing agent.

Flame retardant compositions of this invention were formed by including the following components or ingredients in the formulations: a reaction product of SAYTEX® RB-79 flame retardant made according to one of the above Examples; Antiblaze 519 flame retardant (an isopropylated phenyl phosphate from Rhodia); Irgastab® PUR 55 antioxidant (Ciba Specialty Chemicals, Inc.). Comparative compositions were made similarly, but used SAYTEX® RB-79 diol flame retardant or no brominated flame retardant instead of a reaction product of SAYTEX® RB-79 flame retardant as in the above Examples.

After polymerization, samples of the respective foams were subjected to Section A of the California 117 test procedure, and the Microwave scorch test in which a scorch index is assigned to each sample using the following designations: 0=no discoloration; 1=just discernable discoloration; 2=light yellow coloration; 3=medium yellow coloration; 4=dark yellow/orange coloration; and 5=brown coloration.

Table 1 sets forth the proportions of the components used in each of the flame retardant compositions of the invention in terms of parts per hundred parts of polyol (by weight), and summarizes the results of these tests. Table 2 summarizes the results for the comparative runs and the proportions of the components used in each of the flame retardant compositions of the comparative samples.

TABLE 1

| | | Sample | | | | | |
|---|---|---|---|---|---|---|---|
| | | 1 | 2 | 3 | 4 | 5 | 6 |
| Polyol | | 100.00 | 100.00 | 100.00 | 100.00 | 100.00 | 100.00 |
| Surfactant | | 0.800 | 0.800 | 0.800 | 0.800 | 0.800 | 0.800 |
| Amine Catalysts | | 0.159 | 0.159 | 0.159 | 0.159 | 0.159 | 0.159 |
| Tin Catalyst | | 0.668 | 0.668 | 0.668 | 0.668 | 0.668 | 0.668 |
| Blowing Agent, $H_2O$ | | 3.416 | 3.416 | 3.416 | 3.416 | 3.416 | 3.416 |
| Blowing Agent, MeCl | | 5.460 | 5.460 | 5.460 | 5.460 | 5.460 | 5.460 |
| Toluene Diisocyanate | | 43.807 | 43.807 | 43.807 | 43.807 | 43.807 | 43.807 |
| Diacetate Product of Brominated Diol | | 8.400 | 8.400 | 8.400 | | | |
| Diphosphate Product of Brominated Diol | | | | | 8.400 | 8.400 | 8.400 |
| Aromatic Phosphate | | 3.600 | 3.600 | 3.600 | 3.600 | 3.600 | 3.600 |
| Hindered Amine Antioxidants | | 0 | 0.12 | 1.2 | 0 | 0.12 | 1.2 |
| Reactivity | Cream Time | 1:15 | | | 1:14 | | |
| | Gel Time | 3:00 | | | 3:10 | | |
| | Rise Time | 4:25 | | | 4:35 | | |
| TGA | Peak 1 | 150 | | | 303 | | |
| | Peak 2 | 290 | | | | | |
| | Peak 3 | 350 | | | | | |
| Cal. 117, Sec. A | Char length | 3.13 in. | 3.19 in. | — | 3.03 in. | 3.12 in. | |
| | After burn time | 0 sec. | 0 sec. | | 0 sec. | 0 sec. | |
| Scorch | Index* | 2.00 | 1–2 | 0–1 | 5 | 3 | 3 |
| | Temperature | 184° C. | 182° C. | 180° C. | 184° C. | 182° C. | 184° C. |

*0 = no discoloration;
1 = just discernable discoloration;
2 = light yellow;
3 = medium yellow;
4 = dark yellow/orange;
5 = brown

TABLE 2

| | | Sample | | |
|---|---|---|---|---|
| | | A | B | C |
| Polyol | | 100.00 | 100.00 | 100.00 |
| Surfactant | | 0.800 | 0.800 | 0.800 |
| Amine Catalysts | | 0.159 | 0.159 | 0.159 |
| Tin Catalyst | | 0.668 | 0.668 | 0.668 |
| Blowing Agent, $H_2O$ | | 3.416 | 3.416 | 3.416 |
| Blowing Agent, MeCl | | 5.460 | 5.460 | 5.460 |
| Toluene Diisocyanate | | 46.374 | 46.374 | 46.374 |

TABLE 2-continued

| | | Sample | | |
|---|---|---|---|---|
| | | A | B | C |
| Brominated Diol | | 8.400 | 7.506 | 0 |
| Aromatic Phosphate | | 3.600 | 3.600 | 3.600 |
| Hindered Amine Antioxidants | | — | 1.277 | |
| Reactivity | Cream Time | | | 1:19 |
| | Gel Time | | | 2:30 |
| | Rise Time | | | 3:50 |
| Cal. 117, Sec. A | Char length | 2.34 in. | 3.63 in. | |
| | After burn time | 0 sec. | 0 sec. | |
| Scorch | Index* | 3 | 1–2 | |
| | Temperature | 185° C. | 184° C. | |

*0 = no discoloration; 1 = just discernable discoloration; 2 = light yellow; 3 = medium yellow; 4 = dark yellow/orange; 5 = brown Further embodiments of the invention are as follows:

(AA) A method of producing a flexible polyurethane foam composition of the type formed from isocyanate and polyol, which method comprises (I) including in a polymerization formulation:

a) at least one reaction product of a brominated aromatic diester diol and an alcohol-reactive agent, which agent is (i) an anhydride containing from four to about eight carbon atoms, (ii) an acyl halide containing from two to about eight carbon atoms, (iii) at least one dihydrocarbyl phosphate, (iv) at least one dihalohydrocarbyl phosphate, wherein each halogen atom is chlorine or bromine, (v) at least one dihydrocarbyl chlorophosphate, (vi) at least one dihalohydrocarbyl chlorophosphate, wherein each halogen atom is chlorine or bromine, (vii) at least one dihydrocarbyl chlorothiophosphate, (viii) at least one dihalohydrocarbyl chlorothiophosphate, wherein each halogen atom is chlorine or bromine, or (ix) mixtures of two or more of the foregoing;

b) at least one hindered amine antioxidant; and c) at least one phenolic antioxidant in which the phenolic ring is substituted by an alkanoic acid alkyl ester group in which alkanoic acid moiety has in the range of 2 to about 4 carbon atoms and the alkyl group has in the range of about 6 to about 16 carbon atoms;

in amounts sufficient to provide flame retardancy and scorch resistance to the flexible foam being produced, and (II) reacting the resultant formulation to form a flame retardant scorch resistant flexible polyurethane foam.

(AB) A method as in (AA) wherein a) consists essentially of a reaction product of an anhydride and a mixed ester of tetrabromophthalic anhydride with diethylene glycol and propylene glycol, or consists essentially of a reaction product of a dihydrocarbyl chlorophosphate and a mixed ester of tetrabromophthalic anhydride with diethylene glycol and propylene glycol.

(AC) A method as in (AA) wherein a) consists essentially of a reaction product of acetic anhydride and a mixed ester of tetrabromophthalic anhydride with diethylene glycol and propylene glycol.

(AD) A method as in (AA) wherein a) consists essentially of a reaction product of a diaryl chlorophosphate and a mixed ester of tetrabromophthalic anhydride with diethylene glycol and propylene glycol.

(AE) A method as in (AA) wherein a) consists essentially of a reaction product of diphenyl chlorophosphate and a mixed ester of tetrabromophthalic anhydride with diethylene glycol and propylene glycol.

(AF) A method as in (AA) wherein b) consists essentially of at least one liquid alkylated diphenylamine in which the alkyl ring substituent or substituents each contain in the range of about 4–9 carbon atoms.

(AG) A method as in (AA) wherein c) consists essentially of a $C_7$–$C_9$ branched alkyl ester of 3,5-di-tert-butyl-4-hydroxylphenylpropionic acid.

(AH) A method as in (AA) wherein a) consists essentially of a reaction product of an anhydride and a mixed ester of tetrabromophthalic anhydride with diethylene glycol and propylene glycol, or consists essentially of a reaction product of a dihydrocarbyl chlorophosphate and a mixed ester of tetrabromophthalic anhydride with diethylene glycol and propylene glycol; wherein b) consists essentially of at least one liquid alkylated diphenylamine in which the alkyl ring substituent or substituents each contain in the range of about 4–9 carbon atoms; and wherein c) consists essentially of a $C_7$–$C_9$ branched alkyl ester of 3,5-di-tert-butyl-4-hydroxylphenylpropionic acid.

(AI) A method as in (AA) wherein a) consists essentially of a reaction product of acetic anhydride and a mixed ester of tetrabromophthalic anhydride with diethylene glycol and propylene glycol; wherein b) consists essentially of at least one liquid alkylated diphenylamine in which the alkyl ring substituent or substituents each contain in the range of about 4–9 carbon atoms; and wherein c) consists essentially of a $C_7$–$C_9$ branched alkyl ester of 3,5-di-tert-butyl-4-hydroxylphenylpropionic acid.

(AJ) A method as in (AA) wherein a) consists essentially of a reaction product of diaryl chlorophosphate and a mixed ester of tetrabromophthalic anhydride with diethylene glycol and propylene glycol; wherein b) consists essentially of at least one liquid alkylated diphenylamine in which the alkyl ring substituent or substituents each contain in the range of about 4–9 carbon atoms; and wherein c) consists essentially of a $C_7$–$C_9$ branched alkyl ester of 3,5-di-tert-butyl-4-hydroxylphenylpropionic acid.

(AK) A method as in (AA) wherein a) consists essentially of a reaction product of diphenyl chlorophosphate and a mixed ester of tetrabromophthalic anhydride with diethylene glycol and propylene glycol; wherein b) consists essentially of at least one liquid alkylated diphenylamine in which the alkyl ring substituent or substituents each contain in the range of about 4–9 carbon atoms; and wherein c) consists essentially of a $C_7$–$C_9$ branched alkyl ester of 3,5-di-tert-butyl-4-hydroxylphenylpropionic acid.

(AL) In a flexible polyurethane foam composition of the type formed by mixing isocyanate and polyol along with at least one surfactant, at least one blowing agent, at least one catalyst, and reacting the mixture, the improvement which comprises the inclusion in the polymerization formulation of a flame retardant amount of additive components or ingredients a), b), and c) of any of (AA)–(AK).

(AM) A method of producing a flexible polyurethane foam composition, which method comprises including a flame retardant amount of a composition of any of (AA)–(AK) in a polymerization formulation comprised of isocyanate and polyol along with at least one surfactant, at least one blowing agent, at least one catalyst, and reacting the mixture to form a flexible polyurethane foam.

(AN) A method as in (AA) wherein said a), b), and c) are included as a preformed liquid composition in said polymerization formulation.

(AO) A method as in (AA) wherein said a), b), and c) are included individually and/or as subcombinations of less than all of a), b), and c), so that taken together all of a), b), and c) are included in said polymerization formulation.

(AP) A method as in any of (AA)–(AO) wherein on a weight basis the proportions of b) to c) included in said polymerization formulation are in the range of about 3:1 to about 1:3; and wherein the weight ratio of a) to b) plus c) included in said polymerization formulation is in the range of about 5:1 to about 25:1.

(AQ) A method of producing a flexible polyurethane foam composition of the type formed from isocyanate and polyol, which method comprises (I) including in a polymerization formulation a flame retardant additive composition as in any of (AB)–(AK), and (II) reacting the resultant formulation to form a flexible polyurethane foam.

(AR) A flame retardant flexible polyurethane foam composition formed from components or ingredients comprising isocyanate, polyol, surfactant, catalyst, and blowing agent, wherein the components or ingredients used in forming said polyurethane foam are further comprised of a) at least one reaction product of a brominated aromatic diester diol and an alcohol-reactive agent, wherein said alcohol-reactive agent is (i) an anhydride containing from four to about eight carbon atoms, (ii) an acyl halide containing from two to about eight carbon atoms, (iv) at least one dihydrocarbyl phosphate; (v) at least one dihalohydrocarbyl phosphate, wherein each halogen atom is chlorine or bromine, (v) at least one dihydrocarbyl chlorophosphate; (vi) at least one dihalohydrocarbyl chlorophosphate, wherein each halogen atom is chlorine or bromine; (vii) at least one dihydrocarbyl chlorothiophosphate; (viii) at least one dihalohydrocarbyl chlorothiophosphate, wherein each halogen atom is chlorine or bromine; or (ix) mixtures of two or more of the foregoing;

b) at least one hindered amine antioxidant; and c) at least one phenolic antioxidant in which the phenolic ring is substituted by an alkanoic acid alkyl ester group in which alkanoic acid moiety has in the range of 2 to about 4 carbon atoms and the alkyl group has in the range of about 6 to about 16 carbon atoms;

in amounts sufficient to provide flame retardancy and scorch resistance to the flexible foam.

(AS) A composition as in (AR) wherein a) consists essentially of a reaction product of an anhydride and a mixed ester of tetrabromophthalic anhydride with diethylene glycol and propylene glycol, or consists essentially of a reaction product of a dihydrocarbyl chlorophosphate and a mixed ester of tetrabromophthalic anhydride with diethylene glycol and propylene glycol.

(AT) A composition as in (AR) wherein a) consists essentially of a reaction product of acetic anhydride and a mixed ester of tetrabromophthalic anhydride with diethylene glycol and propylene glycol.

(AU) A composition as in (AR) wherein a) consists essentially of a reaction product of a diaryl chlorophosphate and a mixed ester of tetrabromophthalic anhydride with diethylene glycol and propylene glycol.

(AV) A composition as in (AR) wherein a) consists essentially of a reaction product of diphenyl chlorophosphate and a mixed ester of tetrabromophthalic anhydride with diethylene glycol and propylene glycol.

(AW) A composition as in (AR) wherein b) consists essentially of at least one liquid alkylated diphenylamine in which the alkyl ring substituent or substituents each contain in the range of about 4–9 carbon atoms.

(AX) A composition as in (AR) wherein c) consists essentially of a $C_7$–$C_9$ branched alkyl ester of 3,5-di-tert-butyl-4-hydroxylphenylpropionic acid.

(AY) A composition as in (AR) wherein a) consists essentially of a reaction product of an anhydride and a mixed ester of tetrabromophthalic anhydride with diethylene glycol and propylene glycol, or consists essentially of a reaction product of a dihydrocarbyl chlorophosphate; wherein b) consists essentially of at least one liquid alkylated diphenylamine in which the alkyl ring substituent or substituents each contain in the range of about 4–9 carbon atoms; and wherein c) consists essentially of a $C_7$–$C_9$ branched alkyl ester of 3,5-di-tert-butyl-4-hydroxylphenylpropionic acid.

(AZ) A composition as in (AR) wherein a) consists essentially of a reaction product of acetic anhydride and a mixed ester of tetrabromophthalic anhydride with diethylene glycol and propylene glycol; wherein b) consists essentially of at least one liquid alkylated diphenylamine in which the alkyl ring substituent or substituents each contain in the range of about 4–9 carbon atoms; and wherein c) consists essentially of a $C_7$–$C_9$ branched alkyl ester of 3,5-di-tert-butyl-4-hydroxylphenylpropionic acid.

(BA) A composition as in (AR) wherein a) consists essentially of a reaction product of a diaryl chlorophosphate and a mixed ester of tetrabromophthalic anhydride with diethylene glycol and propylene glycol; wherein b) consists essentially of at least one liquid alkylated diphenylamine in which the alkyl ring substituent or substituents each contain in the range of about 4–9 carbon atoms; and wherein c) consists essentially of a $C_7$–$C_9$ branched alkyl ester of 3,5-di-tert-butyl-4-hydroxylphenylpropionic acid.

(BB) A composition as in (AR) wherein a) consists essentially of a reaction product of diphenyl chlorophosphate and a mixed ester of tetrabromophthalic anhydride with diethylene glycol and propylene glycol; wherein b) consists essentially of at least one liquid alkylated diphenylamine in which the alkyl ring substituent or substituents each contain in the range of about 4–9 carbon atoms; and wherein c) consists essentially of a $C_7$–$C_9$ branched alkyl ester of 3,5-di-tert-butyl-4-hydroxylphenylpropionic acid.

(BC) In a flexible polyurethane foam composition of the type formed by mixing isocyanate and polyol along with at least one surfactant, at least one blowing agent, at least one catalyst, and reacting the mixture, the improvement which comprises the inclusion in the polymerization formulation of a flame retardant amount of additive components or ingredients a), b), and c) of any of (AR)–(BB).

(BD) A method of producing a flexible polyurethane foam composition, which method comprises including a flame retardant amount of a composition of any of (AR)–(BB) in a polymerization formulation comprised of isocyanate and polyol along with at least one surfactant, at least one blowing agent, at least one catalyst, and reacting the mixture to form a flexible polyurethane foam.

(BE) A polyurethane foam as in any of (AR)–(BD) wherein the amounts of components or ingredients a), b), and c) used in forming said mixture are such that on a weight basis (1) the proportions of b) to c) are in the range of about 3:1 to about 1:3; and (2) the weight ratio of a) to b) plus c) is in the range of about 5:1 to about 25:1.

Even though the embodiments hereinabove may refer to substances, components and/or ingredients in the present tense ("comprises", "is", etc.), the reference is to the substance, component or ingredient as it existed at the time just before it was first contacted, blended or mixed with one or more other substances, components and/or ingredients, or if formed in solution, as it would exist if not formed in solution, all in accordance with the present disclosure. It matters not that a substance, component or ingredient may have lost its original identity through a chemical reaction or transformation during the course of such contacting, blending, mixing, or in situ formation, if conducted in accordance with this disclosure.

Each and every patent or publication referred to in any portion of this specification is incorporated in toto into this disclosure by reference, as if fully set forth herein.

This invention is susceptible to considerable variation in its practice. Therefore the foregoing description is not intended to limit, and should not be construed as limiting, the invention to the particular exemplifications presented hereinabove.

That which is claimed is:

1. A flame retardant which comprises the reaction product of (A) at least one brominated aromatic diester diol with (B) at least one alcohol-reactive agent which is (i) an anhydride containing from four to about eight carbon atoms, (ii) at least one dihydrocarbyl phosphate, (iii) at least one dihalohydrocarbyl phosphate, wherein each halogen atom is chlorine or bromine, (iv) at least one dehydrocarbyl chlorophosphate, (v) at least one dihalohydrocarbyl chlorophosphate, wherein each halogen atom is chlorine or bromine, (vi) at least one dihydrocarbyl chlorothiophosphate, (vii) at least one dihalohydrocarbyl chlorothiophosphate, wherein each halogen atom is chlorine or bromine, or (viii) mixtures of two or more of the foregoing.

2. A flame retardant according to claim 1 wherein (A) consists essentially of a mixed ester of tetrabromophthalic anhydride with diethylene glycol and propylene glycol.

3. A flame retardant according to claim 1 wherein (B) is an anhydride or a dihydrocarbyl chlorophosphate.

4. A flame retardant according to claim 1 wherein (B) is acetic anhydride.

5. A flame retardant according to claim 1 wherein (B) is a diaryl chlorophosphate.

6. A flame retardant according to claim 5 wherein said diaryl chlorophosphate is diphenyl chlorophosphate.

7. A flame retardant according to claim 1 wherein (A) consists essentially of a mixed ester of tetrabromophthalic anhydride with diethylene glycol and propylene glycol, and wherein (B) is an anhydride or a dihydrocarbyl chlorophosphate.

8. A flame retardant according to claim 1 wherein (A) consists essentially of a mixed ester of tetrabromophthalic anhydride with diethylene glycol and propylene glycol, and wherein (B) is acetic anhydride.

9. A flame retardant according to claim 1 wherein (A) consists essentially of a mixed ester of tetrabromophthalic anhydride with diethylene glycol and propylene glycol, and wherein (B) is a diaryl chlorophosphate.

10. A flame retardant according to claim 1 wherein (A) consists essentially of mixed ester of tetrabromophthalic anhydride with diethylene glycol and propylene glycol, and wherein (B) is diphenyl chlorophosphate.

11. A process for preparing a flame retardant which comprises reacting (A) at least one brominated aromatic diester diol and (B) at least one alcohol-reactive agent which is (i) an anhydride containing from four to about eight carbon atoms, (ii) at least one dihydrocarbyl phosphate, (iii) at least one dihalohydrocarbyl phosphate, wherein each halogen atom is chlorine or bromine, (iv) at least one dihydrocarbyl chlorophosphate, (v) at least one dihalohydrocarbyl chlorophosphate, wherein each halogen atom is chlorine or bromine, (vi) at least one dihydrocarbyl chlorothiophosphate, (vii) at least one dihalohydrocarbyl chlorothiophosphate, wherein each halogen atom is chlorine or bromine, or (viii) mixtures of two or more of the foregoing to form a reaction product.

12. A process according to claim 11 wherein (A) consists essentially of a mixed ester of tetrabromophthalic anhydride with diethylene glycol and propylene glycol.

13. A process according to claim 11 wherein (B) is an anhydride or a dihydrocarbyl chlorophosphate.

14. A process according to claim 11 wherein (B) is acetic anhydride.

15. A process according to claim 11 wherein (B) is a diaryl chlorophosphate.

16. A process according to claim 15 wherein said diaryl chlorophosphate is diphenyl chlorophosphate.

17. A process according to claim 11 wherein (A) consists essentially of a mixed ester of tetrabromophthalic anhydride with diethylene glycol and propylene glycol, and wherein (B) is an anhydride or a dihydrocarbyl chlorophosphate.

18. A process according to claim 11 wherein (A) consists essentially of a mixed ester of tetrabromophthalic anhydride with diethylene glycol and propylene glycol, and wherein (B) is acetic anhydride.

19. A process according to claim 11 wherein (A) consists essentially of a mixed ester of tetrabromophthalic anhydride with diethylene glycol and propylene glycol, and wherein (B) is a diaryl chlorophosphate.

20. A process according to claim 11 wherein (A) consists essentially of a mixed ester of tetrabromophthalic anhydride with diethylene glycol and propylene glycol, and wherein (B) is diphenyl chlorophosphate.

21. A process according to claim 11 wherein a reaction product mixture is formed by contact of (A) and (B), and wherein said reaction product mixture is treated with an epoxide.

22. A process according to claim 21 wherein said reaction product mixture is subjected to vacuum distillation prior to being treated with said epoxide.

23. A process according to claim 21 wherein said the hydrocarbyl portion of said epoxide is a branched or straight chain.

24. A process according to claim 23 wherein said epoxide is ethylene oxide, propylene oxide, or isobutylene oxide.

25. A process according to claim 18 wherein a reaction product mixture is formed by contact of (A) and (B), and wherein said reaction product mixture is treated with an epoxide.

26. A process according to claim 21 wherein said reaction product mixture is subjected to vacuum distillation prior to being treated with said epoxide.

27. A process according to claim 25 wherein said epoxide is ethylene oxide, propylene oxide, or isobutylene oxide.

28. A liquid flame retardant additive composition which comprises a liquid mixture formed from at least the following components or ingredients:
   a) at least one reaction product of a brominated aromatic diester diol and an alcohol-reactive agent, wherein said alcohol-reactive agent is (i) an anhydride containing from four to about eight carbon atoms, (ii) an acyl halide containing from two to about eight carbon atoms, (iii) at least one dihydrocarbyl phosphate, (iv) at least one dihalohydrocarbyl phosphate, wherein each halogen atom is chlorine or bromine, (v) at least one dihydrocarbyl chlorophosphate, (vi) at least one dihalohydrocarbyl chlorophosphate, wherein each halogen atom is chlorine or bromine; (vii) at least one dihydrocarbyl chlorothiophosphate; (viii) at least one dihalohydrocarbyl chlorothiophosphate, wherein each halogen atom is chlorine or bromine; or (ix) mixtures of two or more of the foregoing
   b) at least one hindered amine antioxidant; and
   c) at least one phenolic antioxidant in which the phenolic ring is substituted by an alkanoic acid alkyl ester group in which alkanoic acid moiety has in the range of 2 to about 4 carbon atoms and the alkyl group has in the range of about 6 to about 16 carbon atoms;
   wherein the amounts of components or ingredients a), b), and c) used in forming said mixture at such that on a weight basis (1) the proportions of a) to b) are in the range of about 30:70 to about 70:30; (2) the proportions of b) to c) are in the range of about 3:1 to about 1:3; and (3) the weight ratio of a) to b) plus c) is in the range of about 5:1 to about 25:1.

29. A composition as in claim 28 wherein a) consists essentially of a reaction product of an anhydride and a mixed ester of tetrabromophthalic anhydride with diethylene glycol and propylene glycol, or consists essentially of a reaction product of a dihydrocarbyl chlorophosphate and a mixed ester of tetrabromophthalic anhydride with diethylene glycol and propylene glycol.

30. A composition as in claim 28 wherein a) consists essentially of a reaction product of acetic anhydride and a mixed ester of tetrabromophthalic anhydride with diethylene glycol and propylene glycol.

31. A composition as in claim 28 wherein a) consists essentially of a reaction product of diaryl chlorophosphate and a mixed ester of tetrabromophthalic anhydride with diethylene glycol and propylene glycol.

32. A composition as in claim 28 wherein a) consists essentially of a reaction product of diphenyl chlorophosphate and a mixed ester of tetrabromophthalic anhydride with diethylene glycol and propylene glycol.

33. A composition as in claim 28 wherein b) consists essentially of at least one liquid alkylated diphenylamine in which the alkyl ring substituent or substituents each contain in the range of about 4–9 carbon atoms.

34. A composition as in claim 28 wherein c) consists essentially of a $C_7$–$C_9$ branched alkyl ester of 3,5-di-tert-butyl-4-hydroxylphenylpropionic acid.

35. A composition as in claim 28 wherein a) consists essentially of a reaction product of an anhydride and a mixed ester of tetrabromophthalic anhydride with diethylene glycol and propylene glycol, or consists essentially of a reaction product of a dihydrocarbyl chlorophosphate and a mixed ester of tetrabromophthalic anhydride with diethylene glycol and propylene glycol; wherein b) consists essentially of at least one liquid alkylated diphenylamine in which the alkyl ring substituent or substituents each contain in the range of about 4–9 carbon atoms; and wherein c) consists essentially of a $C_7$–$C_9$ branched alkyl ester of 3,5-di-tert-butyl-4-hydroxylphenylpropionic acid.

36. A composition as in claim 28 wherein a) consists essentially of a reaction product of acetic anhydride and a mixed ester of tetrabromophthalic anhydride with diethylene glycol and propylene glycol; wherein b) consists essentially of at least one liquid alkylated diphenylamine in which the alkyl ring substituent or substituents each contain in the range of about 4–9 carbon atoms; and wherein c) consists essentially of a $C_7$–$C_9$ branched alkyl ester of 3,5-di-tert-butyl-4-hydroxylphenylpropionic acid.

37. A composition as in claim 28 wherein a) consists essentially of a reaction product of a diaryl chlorophosphate and a mixed ester of tetrabromophthalic anhydride with diethylene glycol and propylene glycol; wherein b) consists essentially of at least one liquid alkylated diphenylamine in which the alkyl ring substituent or substituents each contain in the range of about 4–9 carbon atoms; and wherein c) consists essentially of a $C_7$–$C_9$ branched alkyl ester of 3,5-di-tert-butyl-4-hydroxylphenylpropionic acid.

38. A composition as in claim 28 wherein a) consists essentially of a reaction product of diphenyl chlorophosphate and a mixed ester of tetrabromophthalic anhydride with diethylene glycol and propylene glycol; wherein b) consists essentially of at least one liquid alkylated diphenylamine in which the alkyl ring substituent or substituents each contain in the range of about 4–9 carbon atoms; and wherein c) consists essentially of a $C_7$–$C_9$ branched alkyl ester of 3,5-di-tert-butyl-4-hydroxylphenylpropionic acid.

39. A method of producing a flexible polyurethane foam composition of the type formed from isocyanate and polyol, which method comprises
(I) including in a polymerization formulation:
   a) at least one reaction product of a brominated aromatic diester diol and an alcohol-reactive agent, wherein said alcohol-reactive agent is (i) an anhydride containing from four to about eight carbon atoms, (ii) an acyl halide containing from two to about eight carbon atoms, (iii) at least one dihydrocarbyl phosphate, (iv) at least one dihalohydrocarbyl phosphate, wherein each halogen atom is chlorine or bromine, (v) at least one dihydrocarbyl chlorophosphate, (vi) at least one dihalohydrocarbyl chlorophosphate, wherein each halogen atom is chlorine or bromine; (vii) at least one dihydrocarbyl chlorothiophosphate; (viii) at least one dihalohydrocarbyl chlorothiophosphate, wherein each halogen atom is chlorine or bromine; or (ix) mixtures of two or more of the foregoing;
   b) at least one hindered amine antioxidant; and
   c) at least one phenolic antioxidant in which the phenolic ring is substituted by an alkanoic acid alkyl ester group in which alkanoic acid moiety has in the range of 2 to about 4 carbon atoms and the alkyl group has in the range of about 6 to about 16 carbon atoms;
   in amounts sufficient to provide flame retardancy and scorch resistance to the flexible foam being produced, and
(II) reacting the resultant formulation to form a flame retardant scorch resistant flexible polyurethane foam.

40. A flame retardant flexible polyurethane foam formed from components or ingredients comprising isocyanate, polyol, surfactant, catalyst, and blowing agent, wherein the components or ingredients used in forming said polyurethane foam are further comprised of:
   a) at least one reaction product of a brominated aromatic diester diol and an alcohol-reactive agent, wherein said alcohol-reactive agent is (i) an anhydride containing from four to about eight carbon atoms, (ii) an acyl halide containing from two to about eight carbon atoms, (iii) at least one dihydrocarbyl phosphate, (iv) at least one dihalohydrocarbyl phosphate, wherein each halogen atom is chlorine or bromine, (v) at least one dihydrocarbyl chlorophosphate, (vi) at least one dihalohydrocarbyl chlorophosphate, wherein each halogen atom is chlorine or bromine; (vii) at least one dihydrocarbyl chlorothiophosphate; (viii) at least one dihalohydrocarbyl chlorothiophosphate, wherein each halogen atom is chlorine or bromine; or (ix) mixtures of two or more of the foregoing;
   b) at least one hindered amine antioxidant; and
   c) at least one phenolic antioxidant in which the phenolic ring is substituted by an alkanoic acid alkyl ester group in which alkanoic acid moiety has in the range of 2 to about 4 carbon atoms and the alkyl group has in the range of about 6 to about 16 carbon atoms;
   in amounts sufficient to provide flame retardancy and scorch resistance to the flexible foam.

* * * * *

UNITED STATES PATENT AND TRADEMARK OFFICE
CERTIFICATE OF CORRECTION

PATENT NO. : 7,153,901 B2  Page 1 of 1
APPLICATION NO. : 10/719948
DATED : December 26, 2006
INVENTOR(S) : Hussain et al.

It is certified that error appears in the above-identified patent and that said Letters Patent is hereby corrected as shown below:

Column 17, line 2 reads "dehydrocarbyl" and should read -- dihydrocarbyl --.

Column 18, line 59 reads "at" and should read -- are --.

Signed and Sealed this

Thirteenth Day of January, 2009

JON W. DUDAS
*Director of the United States Patent and Trademark Office*